United States Patent
Symons

[11] Patent Number: 6,155,580
[45] Date of Patent: *Dec. 5, 2000

[54] PLASTIC TROLLEY

[76] Inventor: Ronny Symons, La Frairie 01360, Beligneux, France

[*] Notice: This patent issued on a continued prosecution application filed under 37 CFR 1.53(d), and is subject to the twenty year patent term provisions of 35 U.S.C. 154(a)(2).

[21] Appl. No.: 09/096,820

[22] Filed: Jun. 12, 1998

(Under 37 CFR 1.47)

Related U.S. Application Data

[63] Continuation of application No. PCT/NL96/00487, Dec. 16, 1996.

[30] Foreign Application Priority Data

Dec. 14, 1995 [NL] Netherlands ............................ 1001904

[51] Int. Cl.[7] ................................................... B62D 39/00

[52] U.S. Cl. ............................... 280/33.991; 280/33.997; 280/DIG. 4

[58] Field of Search ......................... 280/33.995, 33.997, 280/47.34, DIG. 4, 33.991, 651, 659; 425/DIG. 245, DIG. 246, 174; 220/DIG. 12; 296/901

[56] References Cited

U.S. PATENT DOCUMENTS

| | | | |
|---|---|---|---|
| 3,346,271 | 10/1967 | Parsons | 280/33.99 |
| 3,844,577 | 10/1974 | Wahl | 280/33.99 R |
| 4,046,394 | 9/1977 | Thompson, Jr. | 280/33.99 B |
| 4,650,199 | 3/1987 | Rehrig | 280/33.997 |
| 4,678,420 | 7/1987 | Inoue | 425/144 |
| 5,169,024 | 12/1992 | Rinkewich | 220/586 |
| 5,261,806 | 11/1993 | Pleasant | 425/144 |
| 5,769,435 | 6/1998 | Nishida | 280/33.991 |

FOREIGN PATENT DOCUMENTS

| | | |
|---|---|---|
| 0222480 | 5/1987 | European Pat. Off. . |
| 0 672 568 A1 | 9/1995 | European Pat. Off. . |
| 0672568 | 9/1995 | European Pat. Off. . |
| 931108 | 6/1993 | WIPO . |

*Primary Examiner*—J. J. Swann
*Assistant Examiner*—Christopher Bottorff
*Attorney, Agent, or Firm*—Ladas & Parry

[57] ABSTRACT

A plastic trolley, such as a shopping trolley or luggage trolley, includes a loading element, such as a basket or a loading platform which loading element is provided with a handle and is supported by wheels. The loading element and the handle are manufactured in one piece with double walls by means of rotational molding. Furthermore, the basket can have holes which are formed by interconnected parts of the adjacent walls of the double wall construction of the basket.

15 Claims, 2 Drawing Sheets

PLASTIC TROLLEY

This application is a Continuation of PCT/NL96/00487 filed Dec. 16, 1996.

The invention relates to a plastic trolley, such as a shopping trolley or luggage trolley, comprising a loading element, such as a basket or a loading platform, which loading element is provided with a handle and is supported by wheels.

Such a plastic shopping trolley is known from WO-A-9311018. This known plastic shopping trolley is assembled from a fairly large number of plastic parts, of which the main ones are formed by two longitudinal halves which comprise the basket and the frame. The two longitudinal halves must be attached to each other together with the other parts, such as the bottom, front wall and rear wall of the basket.

This construction of the known shopping trolley has the disadvantage that the manufacturing process is labor-intensive. The object of the invention is therefore to provide a plastic trolley which is designed in such a way that it can be manufactured more cheaply. That object is achieved by the fact that the loading element and the handle are manufactured in one piece with double walls by means of rotational molding.

Rotational molding makes it possible to form virtually the entire plastic trolley in one go. Thanks to the double-walled structure which can be obtained during the rotational molding process, the trolley is not only relatively low in weight, but also has great rigidity and strength. In that connection, the basket preferably has holes which are formed by interconnected parts of the adjacent walls of the double wall construction of the basket.

The number of operations needed for manufacturing the trolley can be reduced even further if the basket is supported by a wheeled frame which is integral therewith. The basket and the frame are both manufactured in one manufacturing step by rotational molding; fitting the wheels is the only separate operation.

In at least one of the walls of its double wall construction the frame can have recesses which are connected to the other, adjacent wall. Such recesses which connect the adjacent walls of the double wall construction of the frame have a beneficial effect on the rigidity and strength thereof.

The side of the basket facing the handle is preferably open and bears means for hingedly suspending a closing panel. Said closing panel can be hingedly suspended at its top side, and at its bottom side can bear stop means which can interact with stop means provided on the basket, in order to limit the hinge movement towards the rear side of the basket.

The invention will be explained in greater detail below with reference to a number of exemplary embodiments shown in the figures.

Figure 1:
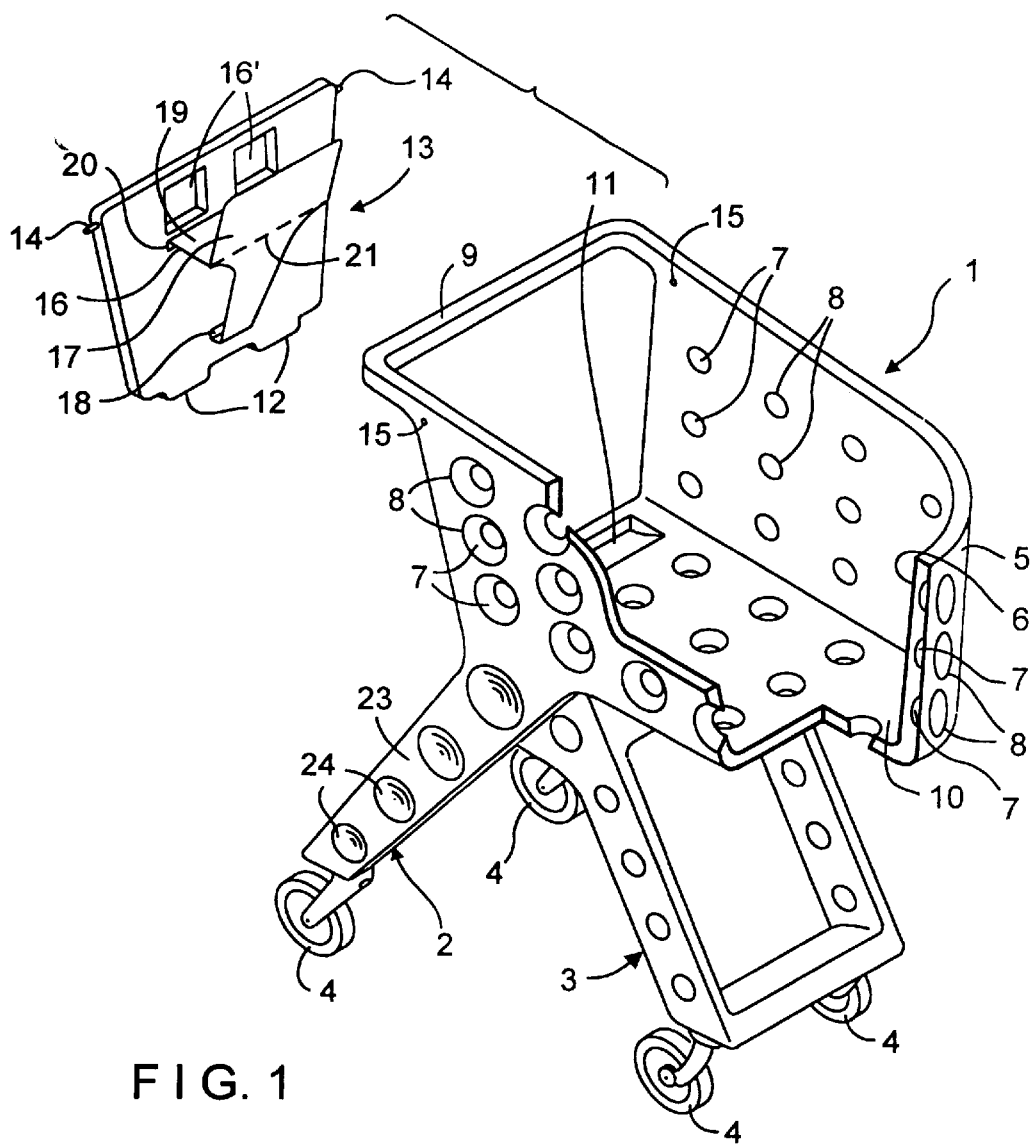
FIG. 1 shows in perspective, and partially in section, a shopping trolley according to the invention.

The shopping trolley shown in FIG. 1 comprises a basket 1, which is supported by legs 2, 3. Castors 4 are fitted on the underside of the legs 2, 3.

As can be seen in the section of FIG. 1, the basket is a double-walled structure, and has an outer wall 5 and an inner wall 6. Pipe-shaped parts 7 which define holes 8 extend between the outer wall 5 and the inner wall 6.

The double wall 5, 6 of the basket 1 is formed by rotational casting. The legs 2 and the handles 9 are co-molded in the same operation.

The bottom 10 of the basket 1 has a recess 11, in which the lugs 12 of the rear wall, indicated in its entirety by 13, can be accommodated. Said rear wall has hinge points 14 which can be accommodated in a hinged manner in corresponding holes 15 in the basket. This means that the rear wall 13 can be swung up in such a way that the basket 1 of a shopping trolley placed behind can be accommodated in a known manner in the basket of the one placed in front of it.

The rear wall 13 has two openings 16 and a collapsible child's seat 16, in such a way that a small child can be carried in the trolley. This seat has a hinged backrest 17, which is rotatable about hinge 18, and a seat face 19 which is hinged by means of hinge 20, and the side 21 of which is slidable relative to the backrest 17.

The legs 3 are likewise integral with the basket 1.

Figure 2:
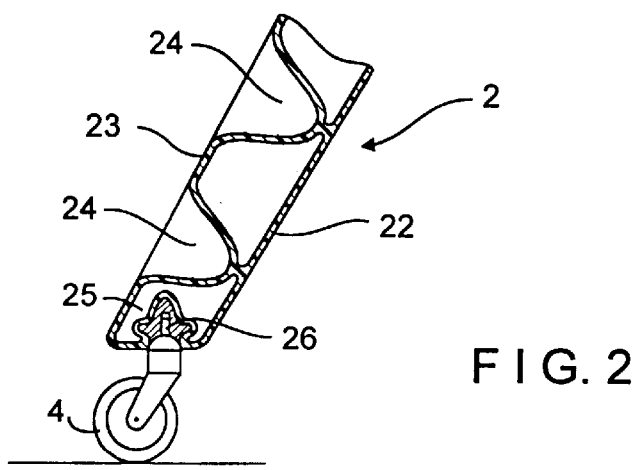
FIG. 2 shows a detail of FIG. 1.

As can be seen in FIG. 2, legs 2 have two walls 22, 23, wall 23 being provided with recesses 24 which extend up to and are fixed to the wall 22.

The legs 2, 3 also have inserts 25, in which the screw thread end 26 of a castor 4 is fixed.

Figure 3:
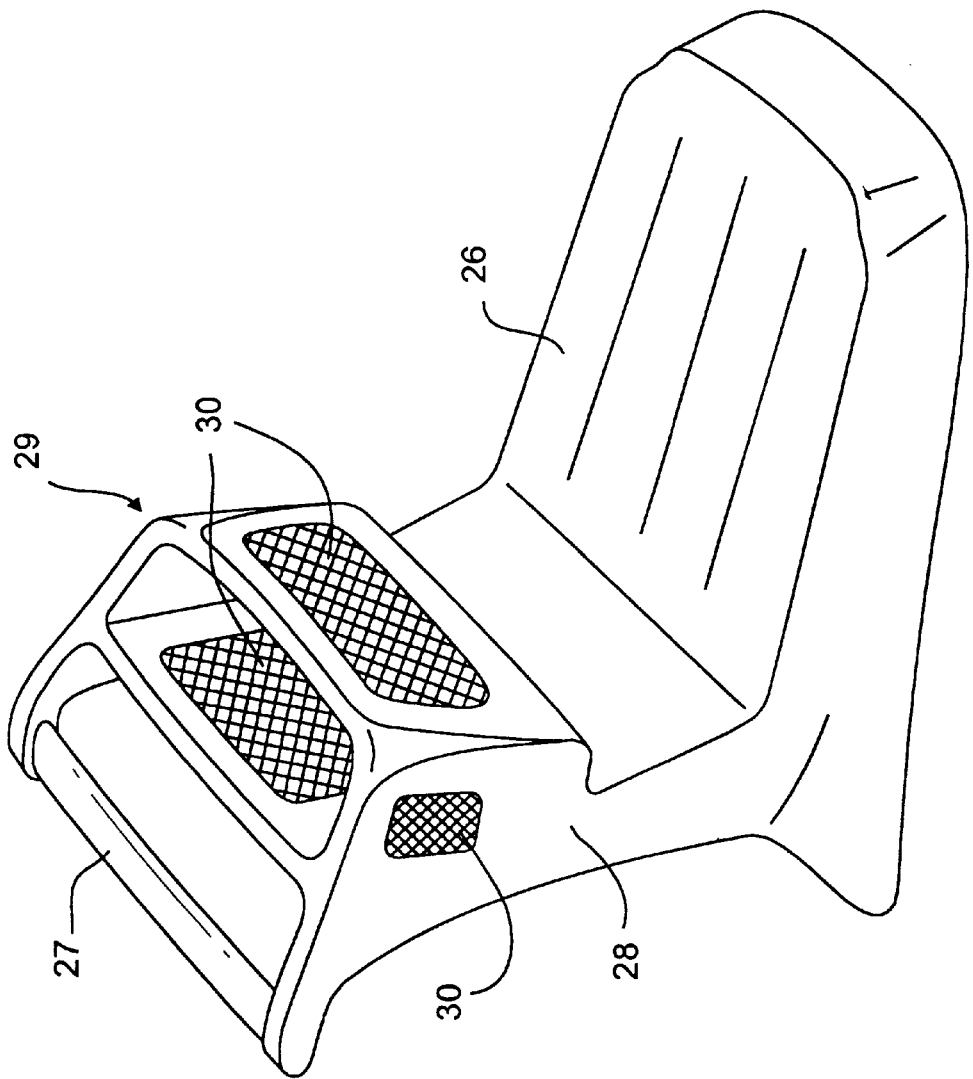
FIG. 3 shows a luggage trolley according to the invention.

The luggage trolley shown in FIG. 3 has a loading platform 26, underneath which wheels (not visible) are fixed. This loading platform 26 is also a double-walled structure. Moreover, the handle 27 is integral with said loading platform 26 and is connected thereto by way of the double-walled rear wall 28.

The rear wall 28 can bear a luggage basket 29, which is also a double-walled structure. The luggage basket 29 can have openings which are closed by means of grilles 30.

What is claimed is:

1. In a trolley comprising a loading element provided with a handle and wheels, the improvement wherein the loading element comprises a single, integral piece of plastic that is molded with double walls, said double walls comprising substantially parallel first and second walls that are adjacent to each other, each of said first and second walls having a plurality of portions that are connected to respective portions of the adjacent wall to strengthen the loading element, the connected portions being integrally formed with each of the first and second walls and defining holes in the loading element with the connected portions surrounding the holes, said first and second walls defining an internal space between them that extends around said connected portions and throughout the loading element.

2. A trolley as claimed in claim 1, wherein the loading element is a basket, the plurality of portions of the first and second walls being interconnected to define the basket with holes therein.

3. A trolley as claimed in claim 2 further comprising a frame supporting the basket, said frame being integrally formed with the basket from said piece of plastic and comprising first and second adjacent frame walls.

4. A trolley as claimed in claim 1, wherein the loading element is a basket, said trolley comprising a frame supporting the basket, said frame being integrally formed with the basket from said piece of plastic and comprising first and second adjacent frame walls each having a plurality of portions that are connected to respective portions of the adjacent frame wall to strengthen the frame, said plurality of portions of the first frame wall defining recesses in the first frame wall that contact respective of said portions of said second frame wall.

5. A trolley as claimed in claim 2, wherein the basket has an opening on a side under the handle, the basket comprising suspension means for hingedly suspending a closing panel in said opening.

6. A trolley as claimed in claim 3, wherein the basket has an opening on a side under the handle, the basket comprising suspension means for hingedly suspending a closing panel in said opening.

7. A trolley as claimed in claim 4, wherein the basket has an opening on a side under the handle, the basket comprising suspension means for hingedly suspending a closing panel in said opening.

8. A trolley as claimed in claim 5, further comprising a closing panel having a top side and a bottom side, said panel being hingedly suspended from said suspension means at the top side, said basket and bottom side comprising respective stop means for interacting with each other to limit a hinge movement of the closing panel toward a rear of the basket.

9. A trolley as claimed in claim 6, further comprising a closing panel having a top side and a bottom side, said panel being hingedly suspended from said suspension means at the top side, said basket and bottom side comprising respective stop means for interacting with each other to limit a hinge movement of the closing panel toward a rear of the basket.

10. A trolley as claimed in claim 7, further comprising a closing panel having a top side and a bottom side, said panel being hingedly suspended from said suspension means at the top side, said basket and bottom side comprising respective stop means for interacting with each other to limit a hinge movement of the closing panel toward a rear of the basket.

11. A trolley as claimed in claim 9, wherein said first and second adjacent frame walls each has a plurality of portions that are connected to respective portions of the adjacent frame wall to strengthen the frame, said plurality of portions of the first frame wall defining recesses in the first frame wall that contact respective of said portions of said second frame wall to strengthen the frame.

12. A method for manufacturing a plastic trolley having a loading element provided with a handle and wheels, said method comprising the steps of:

(a) molding in a single step a plastic material by rotational molding to form said loading element as a single, integral structure with double walls, said molding comprising forming said double walls of the loading element with substantially parallel first and second walls that are adjacent to each other, each of said first and second walls having a plurality of portions that are connected to respective portions of the adjacent wall to strengthen the loading element, the connected portions being integrally formed with each of the first and second walls and defining holes in the loading element with the connected portions surrounding the holes, said first and second walls defining an internal space between them that extends around said connected portions and throughout the loading element; and (b) fitting wheels onto the structure under the loading element and a handle onto the structure above the loading element.

13. A method for manufacturing a plastic trolley having a basket, a handle, a frame and wheels, said method comprising the steps of:

(a) molding in a single step a plastic material by rotational molding to form said basket, handle and a frame as a single, integral structure with double walls; the molding comprising forming the double walls of the basket with substantially parallel first and second walls that are adjacent to each other, each of said first and second walls having a plurality of portions that are interconnected with each other to strengthen the basket the connected portions being integrally formed with each of the first and second walls and defining holes in the basket with the connected portions surrounding the holes, said first and second walls defining an internal space between them that extends around said connected portions and throughout the basket; and (b) fitting wheels onto the structure under the frame.

14. A method according to claim 13, wherein the molding step comprises molding the plastic material so as to form the double walls of the frame with adjacent first and second frame walls, the first frame walls having a plurality of portions that are recessed from the first frame wall and that contact respective portions of the second frame wall to strengthen the frame.

15. A method as claimed in claim 14, wherein the basket is formed with an opening on a side of the basket under the handle and with a hinge for supporting a closing panel in said opening, the method further comprising the step of (c) fitting a closing panel on said hinge.

\* \* \* \* \*